United States Patent [19]
Dague et al.

[11] Patent Number: 6,094,342
[45] Date of Patent: Jul. 25, 2000

[54] DISK DRIVE JACKET

[75] Inventors: Wallis A. Dague, Louisville; Frederick Mark Stefansky, Longmont; Steven Rey Speckmann, Louisville, all of Colo.

[73] Assignee: Seagate Technology, Inc., Scotts Valley, Calif.

[21] Appl. No.: 08/962,755

[22] Filed: Nov. 3, 1997

Related U.S. Application Data

[60] Provisional application No. 60/052,422, Jul. 14, 1997.

[51] Int. Cl.$^7$ .................................. G06F 1/16; H05K 7/14
[52] U.S. Cl. ......................... 361/685; 361/727; 312/333; 439/928.1
[58] Field of Search ..................................... 361/685, 683, 361/724–727; 312/332.1, 333; 439/928.1

[56] References Cited

U.S. PATENT DOCUMENTS

| | | | |
|---|---|---|---|
| 4,941,841 | 7/1990 | Darden et al. | 361/685 |
| 5,216,582 | 6/1993 | Rssell et al. | 361/685 |
| 5,442,513 | 8/1995 | Lo | 361/685 |
| 5,557,499 | 9/1996 | Reiter et al. | 361/685 |
| 5,563,767 | 10/1996 | Chen | 361/685 |
| 5,652,695 | 7/1997 | Schmitt | 361/685 |
| 5,673,172 | 9/1997 | Hastings et al. | 361/685 |
| 5,682,291 | 10/1997 | Jeffries et al. | 361/685 |
| 5,721,669 | 2/1998 | Becker et al. | 361/685 |

OTHER PUBLICATIONS

Device Bay, *Device Bay Interface Specification,* Draft Revision 0.6, Mar. 8, 1997, pp. ii–vii, 1–2 to 1–4, 2–5 to 2–7, unnumbered page, 3–9 to 3–13, unnumbered p., 4–15 to 4–22, unnumbered page, 5–24 to 5–39, unnumbered page, 7–41 to 7–68, 8–69 to 8–77, 9–78.

Device Bay, *Device Bay Interface Specification Working Draft,* Draft Revision 0.79, Jul. 1, 1997, pp. 5–66, 5–67, 5–69, 5–71, unnumbered page, 5–73, unnumbered page, 5–75.

Device Bay, *Device Bay Interface Specification Working Draft,* Draft Revision 0.80, Aug. 28, 1997, pp. 1–26, and 7 unnumbered pages.

Device Bay, *Device Bay Interface Specification,* Draft Revision 0.81, Sep. 12, 1997, pp. 1, 66–78, 89–102.

Device Bay, *Device Bay Interface Specification Working Draft,* Draft Revision0.81, Sep. 16, 1997, pp. 1–21, 23–189, 189–201.

*Primary Examiner*—Leo P. Picard
*Assistant Examiner*—Lisa Lea-Edmonds
*Attorney, Agent, or Firm*—Merchant & Gould P.C.; Jon B. Phillips; Homer L. Knearl

[57] ABSTRACT

A jacket for holding and retaining a disk drive unit in a computer device bay. The jacket protects the disk drive unit from damage during handling, use and storage. The configuration of the jacket permits electrical and electrical ground coupling of the disk drive unit to a computer device bay. The configuration of the jacket also permits engagement with a retaining mechanism in the computer device bay, and permits ejection from the computer device bay without imparting an excessive shock load to the disk drive unit.

19 Claims, 8 Drawing Sheets

DISK DRIVE JACKET

RELATED APPLICATIONS

This invention relates to provisional application Ser. No. 60/052,422, filed Jul. 14, 1997. The contents of this application is incorporated by reference herein.

BACKGROUND

1. Field of the Invention

The present invention relates, generally, to apparatuses for protecting computer peripheral devices and for supporting such computer peripheral devices for insertion into computer device bays, and to processes of making and using the same. Preferred embodiments of the present invention relate to the protection of disk drive units from damage during handling, use and storage, and during insertion into and removal from a computer device bay.

2. Related Art

Current computing and data storage systems can require the transfer and storage of massive amounts of data. To meet the demands of portability and archivability of large amounts of data, systems have been developed which permit swapping of data storage devices, such as hard disk drives, to and from computers and storage areas as needed. Such systems typically employ a computer device bay in a personal computer, network computer, or the like, for receiving a data storage device coupled to a relatively rigid, multi-piece metal bracket.

However, because such systems typically require a user to manually handle the data storage device and bracket assembly during insertion and removal to and from a computer device bay, relatively fragile data storage devices tend to be highly susceptible to damage during the process. In addition, such fragile data storage devices, once removed from the computer device bay, tend to be highly susceptible to damage, for example, during transportation and storage.

Typical disk drive devices are not designed to experience high levels of short duration physical shock without sustaining permanent damage. Such levels of short duration shock commonly occur during manual handling, transportation, storage and insertion and removal of the devices into and from computer device bays.

Accordingly, there is a need in the industry for an apparatus and process for supporting a computer peripheral device during and upon insertion into a computer device bay, and which protects the computer peripheral device from damage due to physical shock of the type typically encountered during insertion, removal, transportation and storage of such devices. In addition, there is also a need in the industry for a process for manufacturing such an apparatus in a cost efficient manner.

SUMMARY OF THE DISCLOSURE

Accordingly, it is an object of preferred embodiments of the present invention to provide an apparatus and a process of making and using the same, for supporting and protecting a computer peripheral device and for insertion and removal from a computer device bay.

In this regard, preferred embodiments of the present relate to jackets designed to receive and protect computer peripheral devices, including, but not limited to disk drive units, tape drive units, or the like, from damage during handling, use and storage. In preferred embodiments, the jacket includes a unitary frame into which a computer peripheral device may be mounted. In one preferred embodiment, the corners of the frame are shock absorbing to protect the computer peripheral device from shock loads. The frame is formed to fit within, and be retained by, a computer device bay. The frame is configured to permit blind mating of the computer peripheral device to electrical connectors within a computer device bay. The frame is preferably provided with an engagement mechanism to engage a corresponding retaining mechanism in the computer device bay. The configuration of the jacket preferably permits a substantially rigid mount of the frame into the computer device bay without the use of threaded fasteners between the frame and the computer device bay.

In a preferred embodiment, the frame is formed as a unitary, integral (single piece) structure formed of injection molded, durable material, such as plastic foam. In further preferred embodiments, the frame may include protruding nubs at the frame corners to space the frame from external surfaces, thereby permitting air cooling of the computer peripheral device while operating in the computer device bay.

In a further preferred embodiment of the invention, the jacket includes grounding conductor strips or springs to electrically ground the computer peripheral device to the computer chassis. Also in a preferred form of the invention, the jacket further includes a frame rear panel interposed between the computer peripheral device and a computer device bay ejection mechanism. This arrangement provides a surface against which a computer device bay ejection mechanism may press against, thereby reducing the shock load imparted to the computer peripheral device when the jacket is expelled from the computer device bay.

DRAWINGS

Referring now to the drawings in which like reference numbers represent corresponding parts throughout:

DETAILED DESCRIPTION OF PREFERRED EMBODIMENTS

Figure 1:
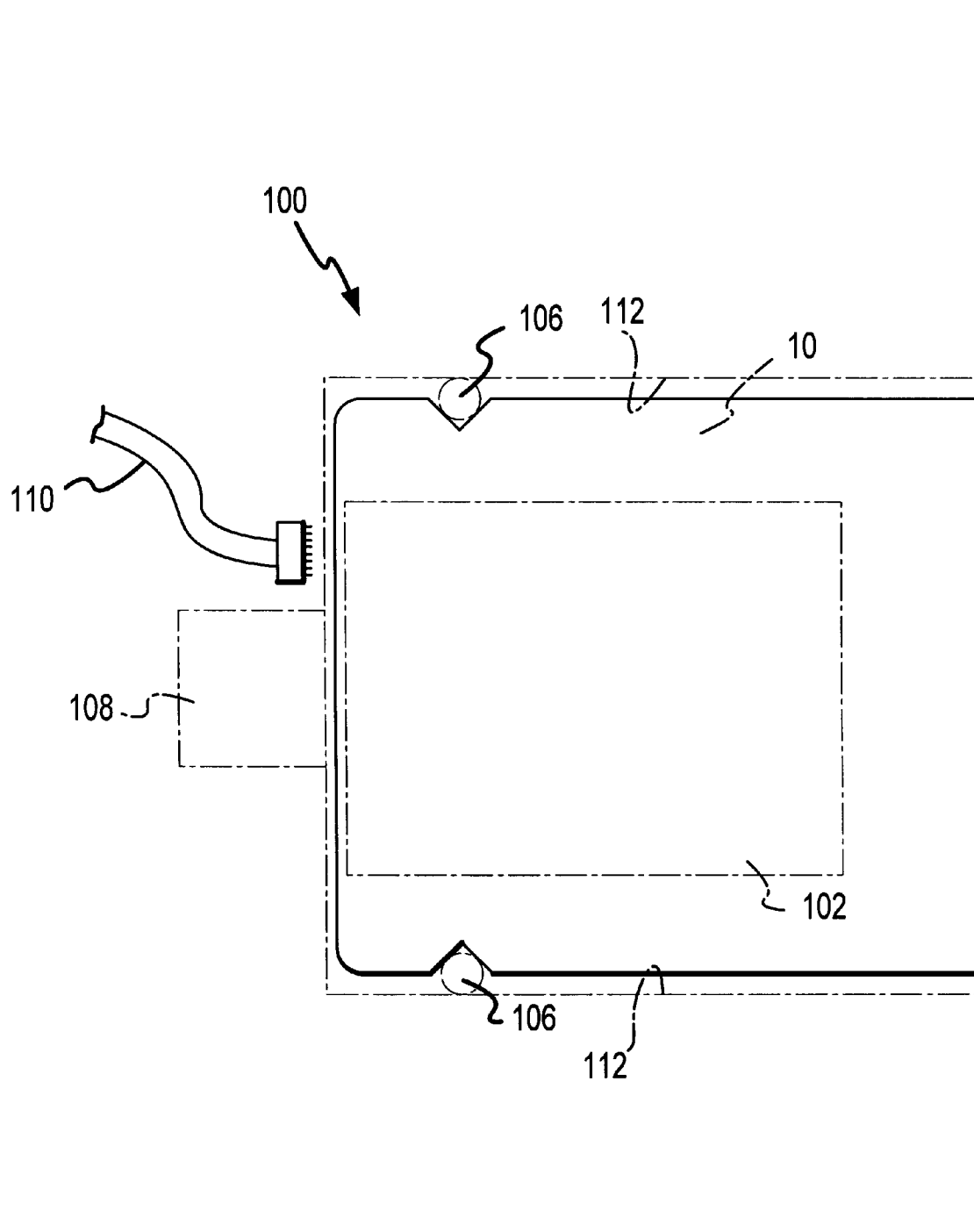
FIG. 1 is top plan view, generally showing a disk drive jacket system, including a disk drive unit installed within a jacket, which is inserted into a computer device bay.

In the following description, reference is made to the accompanying drawings which form a part hereof, and which are shown, by way of illustration, several embodiments of the present invention. It is understood that other embodiments may be utilized and structural changes may be made without departing from the scope of the present invention.

The present invention relates generally to the protection and support of peripheral devices for computers. Preferred embodiments of the present invention relate to systems and apparatuses for protecting computer peripheral devices, including, but not limited to, disk drive units, tape drive units, and the like, from damage during handling, use and storage and for supporting such computer peripheral devices for insertion into computer device bays, and to processes of making and using the same. While embodiments of the invention are applicable with computer peripheral devices other than disk drive units, preferred embodiments are described herein primarily with reference to a disk drive unit 102, for simplifying the disclosure.

In particular, preferred embodiments relate to a jacket for a disk drive unit and a system including a jacket and a disk drive unit, for protecting the disk drive unit from damage during insertion into and removal from a computer device bay, during use in the device bay, during transportation to and from a storage area, and while in a storage area. Further preferred embodiments relate to processes of making and using such a jacket in an economical and efficient manner.

As described in more detail below, one preferred jacket embodiment includes a generally U-shaped frame formed as a single, integral, unitary body, into which a disk drive unit may be received and mounted. Preferably, the U-shaped frame is molded as a single piece, unitary structure, from a rigid plastic foam material, or the like. In further preferred embodiments, the jacket comprises a generally rectangular-shaped frame formed as a single, integral, unitary body, also preferably molded as a single piece, unitary structure, from a rigid plastic foam material, or the like.

The frame is formed to fit within, and be retained in a computer device bay. The frame is preferably provided with means to permit electrical connection, including grounding, of the disk drive unit, upon receipt of the disk drive unit and frame within the computer device bay. In further preferred embodiments, means, such as protruding nubs at the frame corners or extended peripheral frame edges, are provided to space the disk drive unit received therein from external surfaces. Also, the corners of the frame are preferably resiliently deformable to further protect a disk drive unit received within the frame from shock loads.

In preferred embodiments, configuration of the jacket permits a substantially rigid mount of the frame into the device bay without the use of threaded fasteners. In addition, the configuration of the jacket provides a significant degree of durability and protection against physical shock that is often encountered during installation or removal of a disk drive unit from a computer device bay and during transportation, storage and handling of the disk drive unit outside of the bay. Furthermore, the configuration of the jacket preferably lends itself to cost and time efficient manufacturing techniques, including ejection molding, casting, or the like.

FIG. 1 is a schematic drawing of a system including a disk drive jacket 10 and a disk drive unit 102 inserted into a computer device bay 100. Included in the device bay 100 are at least one retaining mechanism 106 (two are shown in the drawing by dashed circles), an ejection mechanism 108 as indicated by the dashed box, and an electrical connector 110. The computer device bay 100 also provides an electrical grounding surface 112. In one preferred form, the disk drive jacket 10 is formed to fit into a 1.25" high by 5.75" wide by 7.0" long computer device bay 100. However, further embodiments may be dimensioned to fit other computer device bay 100 sizes.

Figure 2:
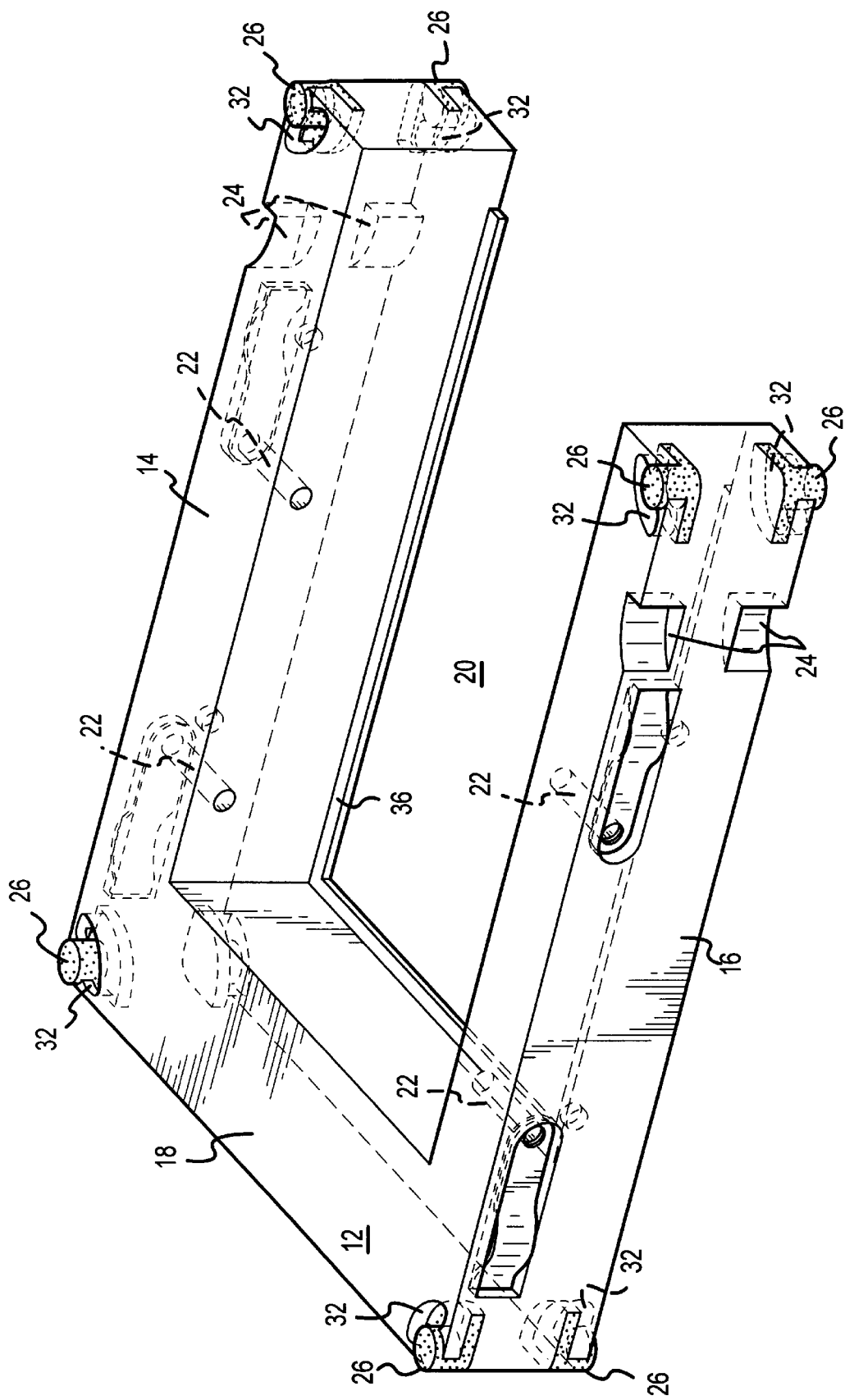
FIG. 2 is a perspective view of a disk drive jacket.
Figure 3:
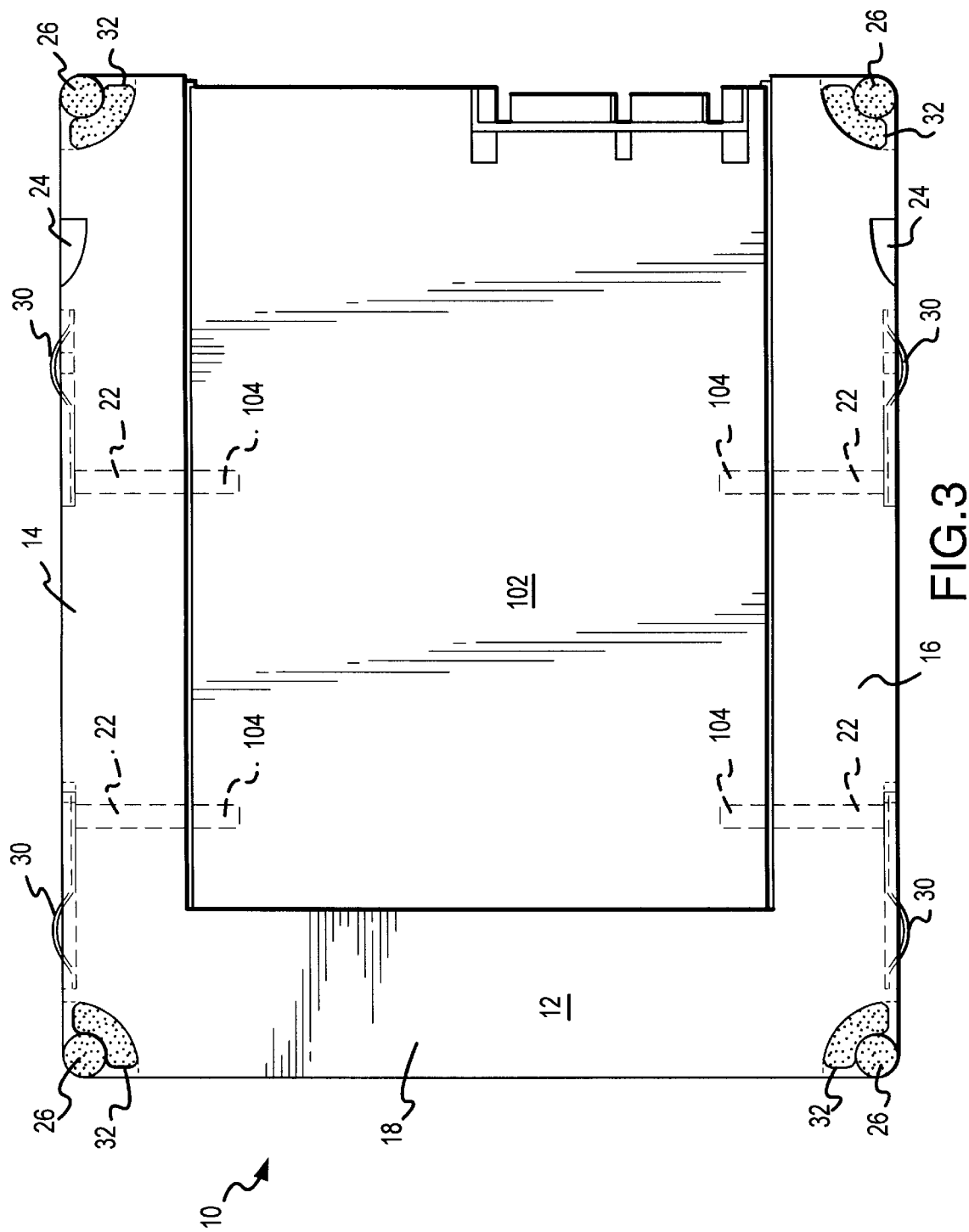
FIG. 3 is a top plan view of the disk drive jacket of FIG. 2, with a disk drive unit installed within the jacket interior.

FIGS. 2 and 3 depict a disk drive jacket 10 according to one preferred embodiment of the present invention, with and without disk drive units 102 installed, respectively. As shown in FIG. 2, the disk drive jacket 10 includes a generally U-shaped frame 12, having at least a first side 14, a second side 16 and a front 18, defining a frame interior 20 for receiving a disk drive unit 102. The frame 12 has an engagement mechanism, such as notches 24 along the first frame side 14 and the second frame side 16, to permit engaging of the frame 12 with the computer device bay retaining mechanism 106. Other embodiments may employ a retaining mechanism on the frame 12 and a corresponding engagement mechanism in the computer device bay 100. The retaining mechanism 106 may comprise any suitable structure configured to engage the engagement mechanism. For example, in the illustrated embodiment, where the engagement mechanisms comprise notches 24, the retaining mechanisms 106 may include, but are not limited to, spring loaded pins and spring loaded bearings.

In preferred embodiments, the frame 12 has corners or corner members configured to provide a significant degree of shock absorbing qualities. According to one preferred example, each shock absorbing corner comprises a protruding nub 26 and a hollow 32 to protect a disk drive unit 102 from damage during handling and use. Protruding nubs 26 at each corner of the frame 12 function to space the frame 12 from adjacent external surfaces. The protruding nubs 26 minimize the likelihood that the disk drive unit 102 will impact surfaces adjacent to the frame 12 as might otherwise occur when the jacket is set down on a hard, flat surface, such as a desk, worktable, storage shelf, or the like, thereby reducing the risk of damage to the disk drive unit 102. The protruding nubs 26 also preferably space the frame 12 from the computer device bay 100 when the jacket 10 is inserted into the computer device bay 100. This arrangement permits air circulation around the disk drive unit 102 to facilitate cooling of the disk drive unit 102 during operation. The hollows 32 enhance the capability of the corners of the frame 12 to resiliently deform under physical shock loads, thereby absorbing at least a portion of the shock and reducing the transfer of the shock to the disk drive unit 102.

Referring to FIG. 3, the first frame side 14 and second frame side 16 have though holes 22, to permit coupling of the frame 12 to a disk drive unit 102. Coupling is accomplished through conventional threaded fasteners or other suitable fastening means (not shown). Preferably, the through holes 22 are arranged to align with industrial standard mounting hole locations 104 in the disk drive unit 102. Referring to FIG. 2, a support member 36 is preferably disposed along the interior of the frame 12 to support a disk drive unit in a manner which positions the industrial standard mounting hole locations 104 adjacent to and aligned with the frame through holes 22. In one preferred embodiment as shown in FIG. 2, the support member 36 is a ledge which is spaced at an appropriate distance (in the vertical dimension of FIG. 2) from each through hole 22 to effect the above-noted alignment. In other preferred embodiments, the support member 36 may extend further into or completely across the frame interior 20, for example, to define a bottom surface of the frame. In such other preferred embodiments, the support member 36 defining the bottom surface of the frame is preferably reticulated to facilitate air cooling of the disk drive unit 102, when received within the frame.

As shown in FIG. 3, the jacket 10 includes grounding members 30, for electrical ground coupling of the disk drive unit 102 to the computer device bay 100. The grounding members 30 are, preferably, metal spring members coupled to the first frame side 14 and to the second frame side 16, proximate to the through holes 22. Locating the grounding springs 30 adjacent to the through holes 22 permits electrical ground coupling of the grounding springs 30 to the disk drive unit 102, using electrically conductive fasteners (not shown), which also function to couple the disk drive unit to the frame, in the manner as discussed above. The grounding springs 30 are positioned so as to protrude outwardly from the first frame side 14 and second frame side 16. When the jacket 10 is inserted into the device bay 100, the grounding springs 30 contact with, and deflect against, the computer device bay grounding surface 112, for completing an electrical ground circuit from the disk drive unit 102 received in the frame to the computer chassis.

In preferred embodiments, the jacket 10 may be inserted into a computer device bay 100 and held in place by the engagement of the frame notches 24 with the retaining mechanisms 106, and by engagement of the grounding springs 30 with the grounding surface 112. Upon engagement, the grounding springs 30 are deflected against the computer device bay grounding surface 112 to maximize the frictional engagement thereof. Preferably, the jacket 10, when inserted into a computer device bay 100, is held in place without the use of threaded fasteners.

Figure 4:
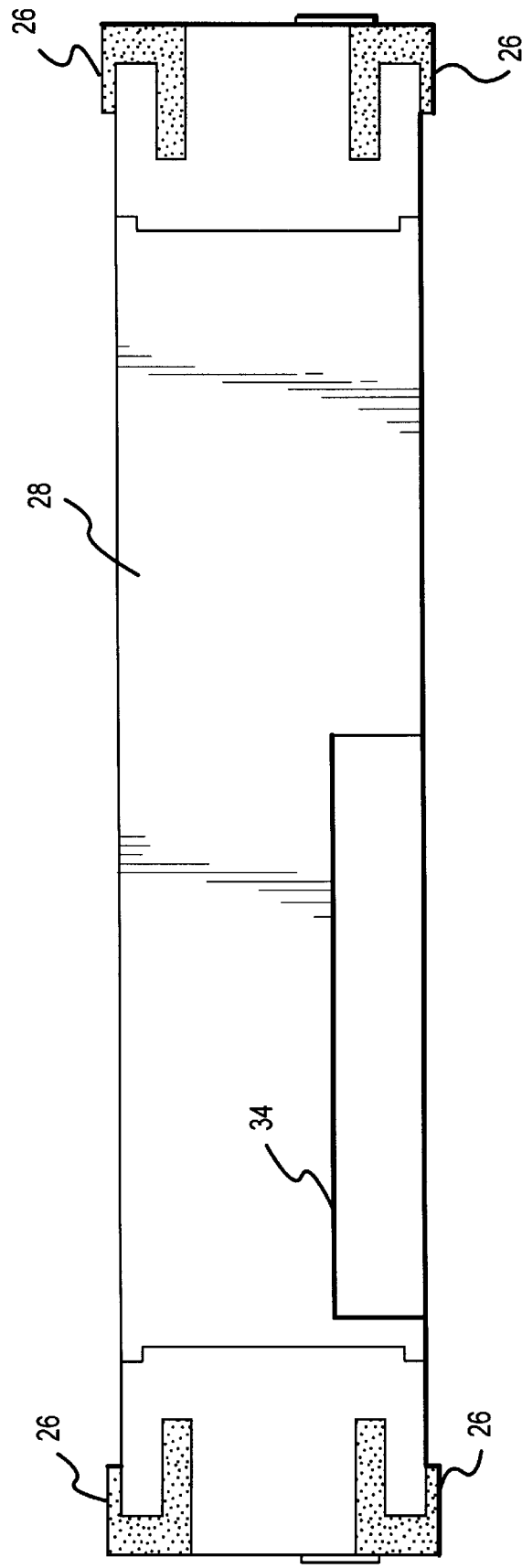
FIG. 4 is an end view of the disk drive jacket of FIG. 2, configured with a frame rear.

As shown in FIG. 4, in one preferred form, the jacket 10 includes a frame rear 28 against which a device bay ejection mechanism 108 may press. The ejection mechanism 108 may be any suitable ejection means for selectively imparting a force to eject a device from a computer bay, for example, similar to the type of conventional mechanisms which eject 3½" floppy diskettes from drive units. Upon actuation, the ejection mechanism 108 engages the frame rear 28, and thereby applies a force against the jacket 10 to at least partially expel the jacket 10 from the computer device bay 100. By interposing the frame rear 28 between the ejection mechanism 108 and the disk drive unit 102, the disk drive unit 102 is at least partially protected from shock imparted by the ejection mechanism 108 during ejection from the computer device bay 100.

The frame rear 28 also provides a means to complete the perimeter containment of a disk drive unit 102 within the frame 12, thereby further protecting the disk drive unit 102 from damage during handling and storage. The frame rear 28 preferably has a cut-out 34, to permit the passage of electrical conductors, such as a conductive prong, a wire handle, or the like, through the frame rear, for electrical coupling of the disk drive unit 102 to the device bay electrical connector 110.

Accordingly, a jacket 10 as shown in FIGS. 1–4 allows a computer peripheral device such as a disk drive unit 102 to be protected from damage during use, handling and storage. Shock absorbing corners of the jacket 10 provide a degree of protection to a peripheral device held within the frame, from imposed shock loads. The jacket 10 is formed to fit within, and be retained in, a computer device bay. Means are provided to facilitate air cooling of a peripheral device while the jacket 10 is inserted into a computer device bay 100. Electrical connection and grounding means are provided between a peripheral device and a computer device bay 100.

The jacket 10 is preferably configured to be manufactured utilizing standard, injection molding processes. In one preferred form, the frame 12 is configured as a single, unitary structure having a shape and configuration suitable for injection molding manufacturing techniques. The frame 12 structure in one preferred form includes thin inner and outer walls joined by interior ribs arranged in a manner suitable to be formed by standard injection molding techniques. The frame rear 28 may be manufactured by any suitable technique, including, but not limited to molding, stamping, cutting, or the like.

Thus, according to a preferred embodiment, a single piece, unitary, generally U-shaped frame structure is formed by injection molding techniques. Following injection molding of the frame structure, suitable machining, boring and/or other manufacturing processes may be performed to complete the manufacture of the frame 12 and frame rear 28 to provide desired apertures and hollow states. The machining, boring and/or other manufacturing processes may include, but not be limited to, completing the hollows 32, the through holes 22 and the notches 24. Alternatively, some or all of those features may be formed during the frame molding step.

Then, grounding springs 30 are attached to the outer surfaces of the sides 14 and 16 of the frame 12, adjacent the through holes 22. The grounding springs 30 may be manufactured from any suitable, electrically conductive material. Eyelets are formed in each of the grounding springs 30 to allow electrically conductive fasteners to pass through the eyelets and make contact with the grounding springs 30. Means to attach the grounding springs 30 to a frame 12 include, but are not limited to, suitable fasteners, anchoring of the grounding springs 30 into a frame 12 as part of the injection molding process, or spring loading of the grounding springs 30 into suitable slots formed on a frame 12 during the molding step or during subsequent machining steps.

A computer peripheral device such as a disk drive unit 102 is preferably mounted or mountable into the interior of the jacket 10, using electrically conductive threaded fasteners coupled to industry standard mounting holes 104. From the jacket 10 exterior, the fasteners pass through eyelets in the grounding springs 30, through the through holes 22 in the frame 12, and are threaded into the industry standard mounting holes 104 in the disk drive unit 102. The heads of the fasteners then contact the grounding springs 30 and complete electrical ground coupling of the grounding springs 30 to the disk drive unit 102.

The jacket 10 holding the disk drive unit 102 is then inserted into a computer device bay 100. The frame 12 exterior and the bay interior are configured to align the computer device bay electrical connector 110 relative to the disk drive unit 102. Upon insertion of the jacket 10 into the computer device bay 100, the grounding springs 30 contact with, and deflect against, the computer device bay grounding surface 112, thereby completing the electrical ground circuit from the disk drive unit 102 to the computer device bay 100. The computer device bay electrical connector 110 engages the disk drive unit 102. Also upon insertion of the jacket 10 into the computer device bay, the computer device bay retaining mechanisms 106 automatically or manually are caused to engage the frame notches 24.

When removal of the jacket 10 from the computer device bay 100 is desired, the computer device bay ejection mechanism 108 is automatically or manually caused to actuate and press against the frame rear 28. The computer device bay retaining mechanism 106 is automatically or manually caused to disengage the frame notches 24. When the jacket 10 is expelled from the computer device bay 100, the disk drive unit 102 disengages the computer device bay electrical connector 110, and the grounding springs 30 disengage the computer device bay grounding surface 112.

A jacket 200, containing a computer peripheral device, such as a disk drive unit 102 (in the form of a floppy disk drive unit), according to a further preferred embodiment of the present invention is shown in FIGS. 5–8. The jacket 200 comprises a generally rectangular shaped frame 210 which defines two outer peripheral side walls 212 and 214, an outer peripheral front wall 216, an outer peripheral rear wall 218 and an interior within the four outer walls. The terms front, side, and rear are used herein to simplify the description of the illustrated embodiments, and are not intended to limit the scope of the present invention.

The frame side walls 212 and 214 are provided with at least one engagement mechanism, such as notches 215, for engaging with at least one retaining mechanism disposed within a computer device bay, similar to the operation of the notches 24 described above with respect to the frame 12 embodiment. The frame front wall 216 includes an opening alignable with the opening of a disk receptacle of the disk drive unit 102.

As shown in FIGS. 5–8, the disk drive unit 102 is positioned within the jacket, off-center with respect to the jacket geometry. In particular, the disk drive unit 102 is positioned closer to the front wall 216 than to the outer peripheral rear wall 218. This allows the disk receptacle 103 (or disk receiving port) of a disk drive unit 102 contained within the jacket to be in close proximity to the outer peripheral front wall 216, for easy access to the disk receptacle 103 from outside of the jacket. In the illustrated embodiment, the disk drive unit 102 is also off-center laterally with respect to the frame 210. In particular, the disk drive unit is positioned closer to outer peripheral side wall 212 than to side wall 214. Through computer simulations, it has been found that an asymmetrical arrangement of the disk drive unit 102 within the frame 210, as shown in the drawings, provides improved shock absorption qualities.

In preferred embodiments, the frame 210 includes at least one bracket for coupling and retaining the disk drive unit 102 within the frame. In the illustrated embodiment, a pair of such brackets 220 and 222 are provided within the jacket interior and are coupled to two respective sides of the disk drive unit 102. In the illustrated embodiment, the brackets 220 and 222 are each coupled to one side of the disk drive unit 102 by a pair of threaded coupling devices, such as bolts or screws. However, in other embodiments, other means for coupling the brackets to the disk drive unit may be employed, including, but not limited to, friction fitting, clamping, adhesives, or the like.

Figure 6:
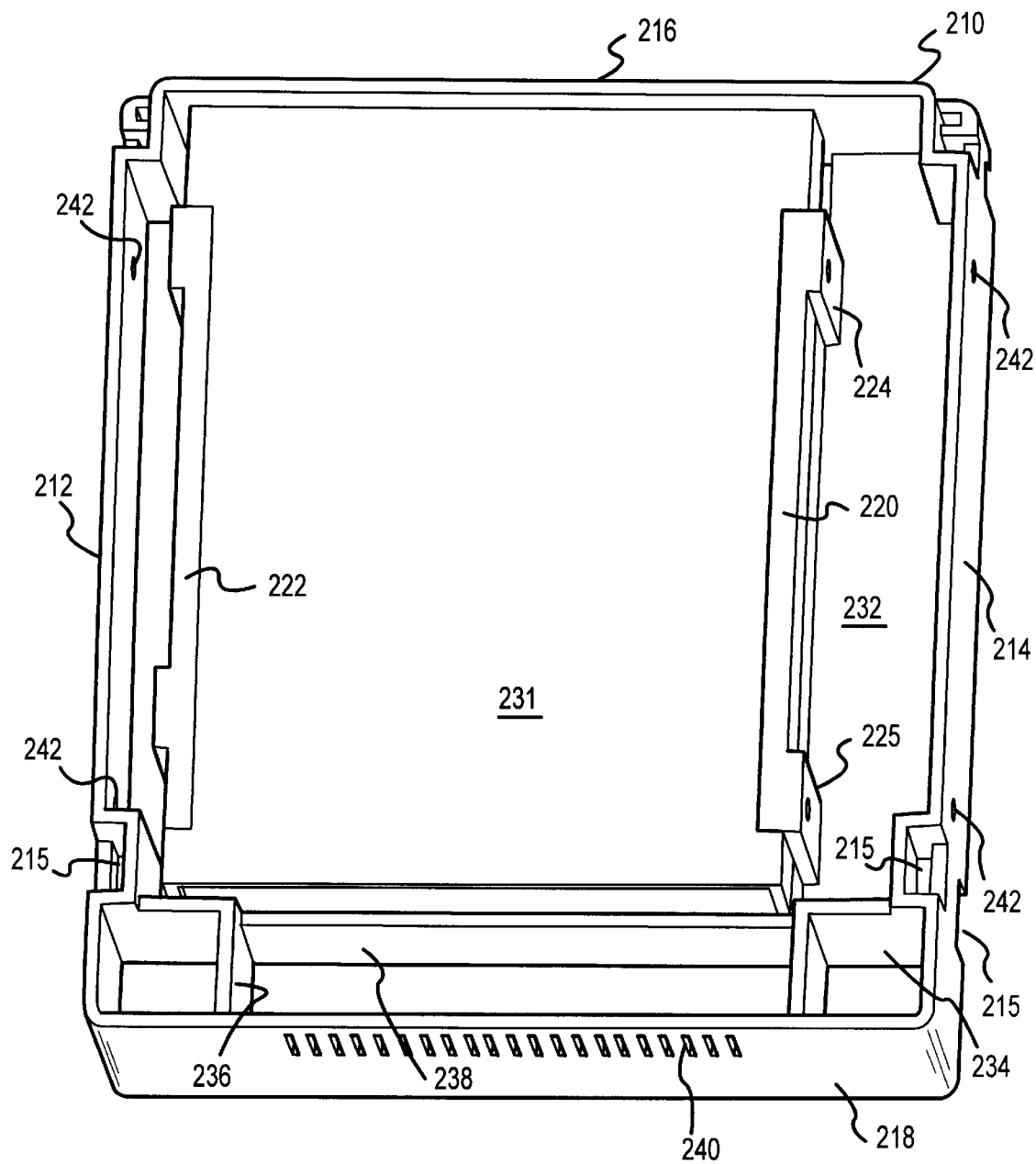
FIG. 6 is a bottom-rear perspective view of the disk drive jacket of FIG. 5, with a disk drive unit installed in the jacket.
Figure 7:
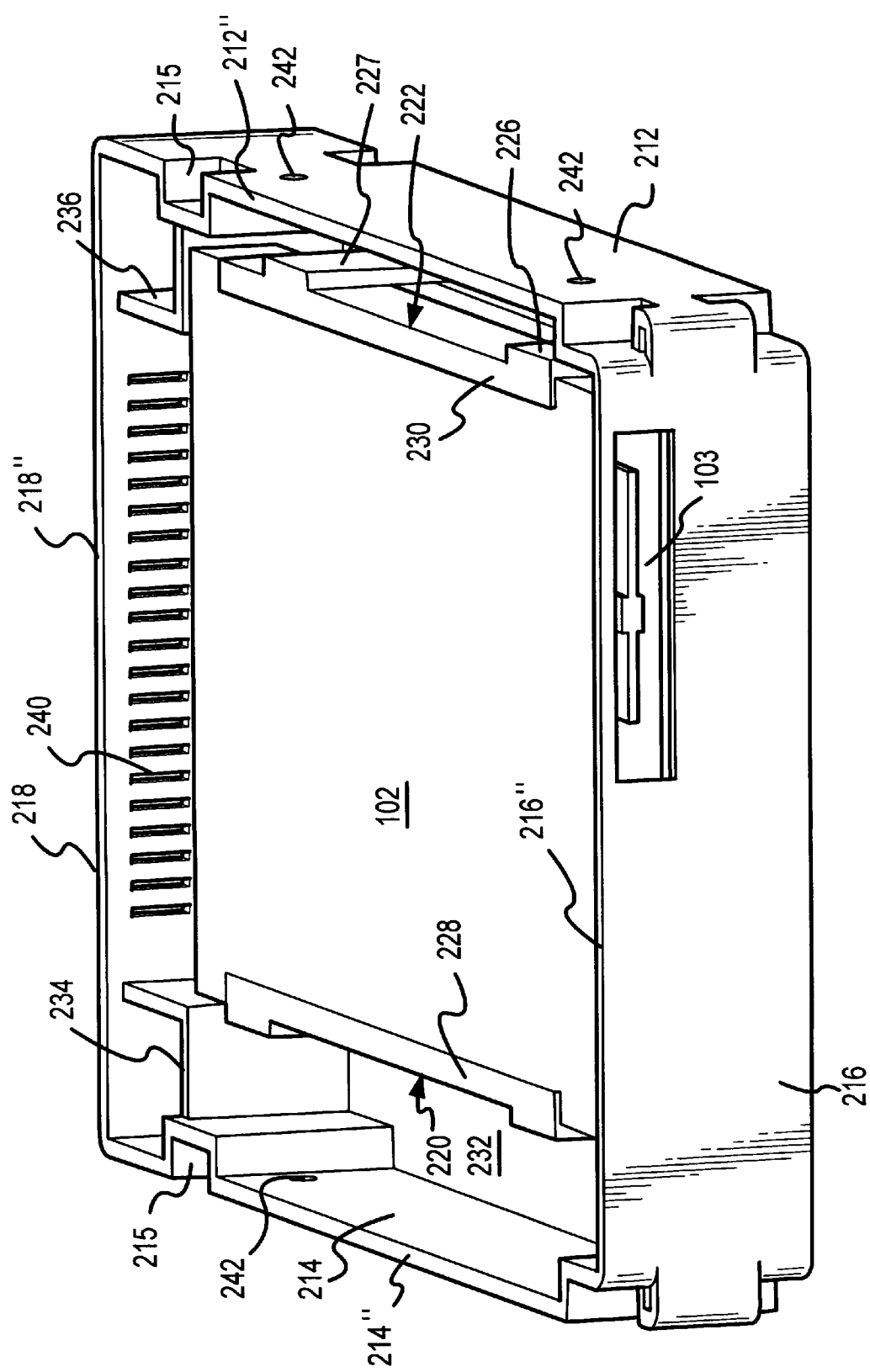
FIG. 7 is a bottom-front perspective view of the disk drive jacket of FIG. 5, with a disk drive unit installed in the jacket.

In the illustrated embodiment, each bracket 220 and 222 includes two arms (arms 224 and 225 of bracket 220 are best shown in FIG. 6, while arms 226 and 227 of bracket 222 are best shown in FIG. 7). Each bracket arm 224–227 has an aperture located in alignment with a corresponding threaded aperture in the disk drive unit, such that threaded connectors (not shown) may extend through the bracket arm apertures and couple with the threaded apertures in the disk drive unit, to secure the disk drive unit to the brackets.

In one preferred embodiments (as shown in FIG. 7), each bracket 220 and 222 defines a lip 228 and 230, respectively, at one end of the bracket arms. Each lip 228 and 230 extends substantially perpendicular to and connects the bracket arms of its respective bracket 220 and 222. Each lip 228 and 230 defines a ledge surface on which the bottom surface of the disk drive unit 102 (shown, facing upward, in FIG. 7) rests, upon the disk drive unit being disposed within the frame interior.

In further preferred embodiments, the brackets 220 and 222 connect a bottom cover 231 to the frame 210. The bottom cover 231 spans the space between the brackets 220 and 220 within which the computer peripheral device (disk drive unit 102) may be received. The bottom cover 231 may function as any one or combination of a shield for protecting a computer peripheral device contained within the jacket from environmental factors, a support surface for supporting a computer peripheral device contained within the jacket, and an aesthetic covering.

Figure 5:
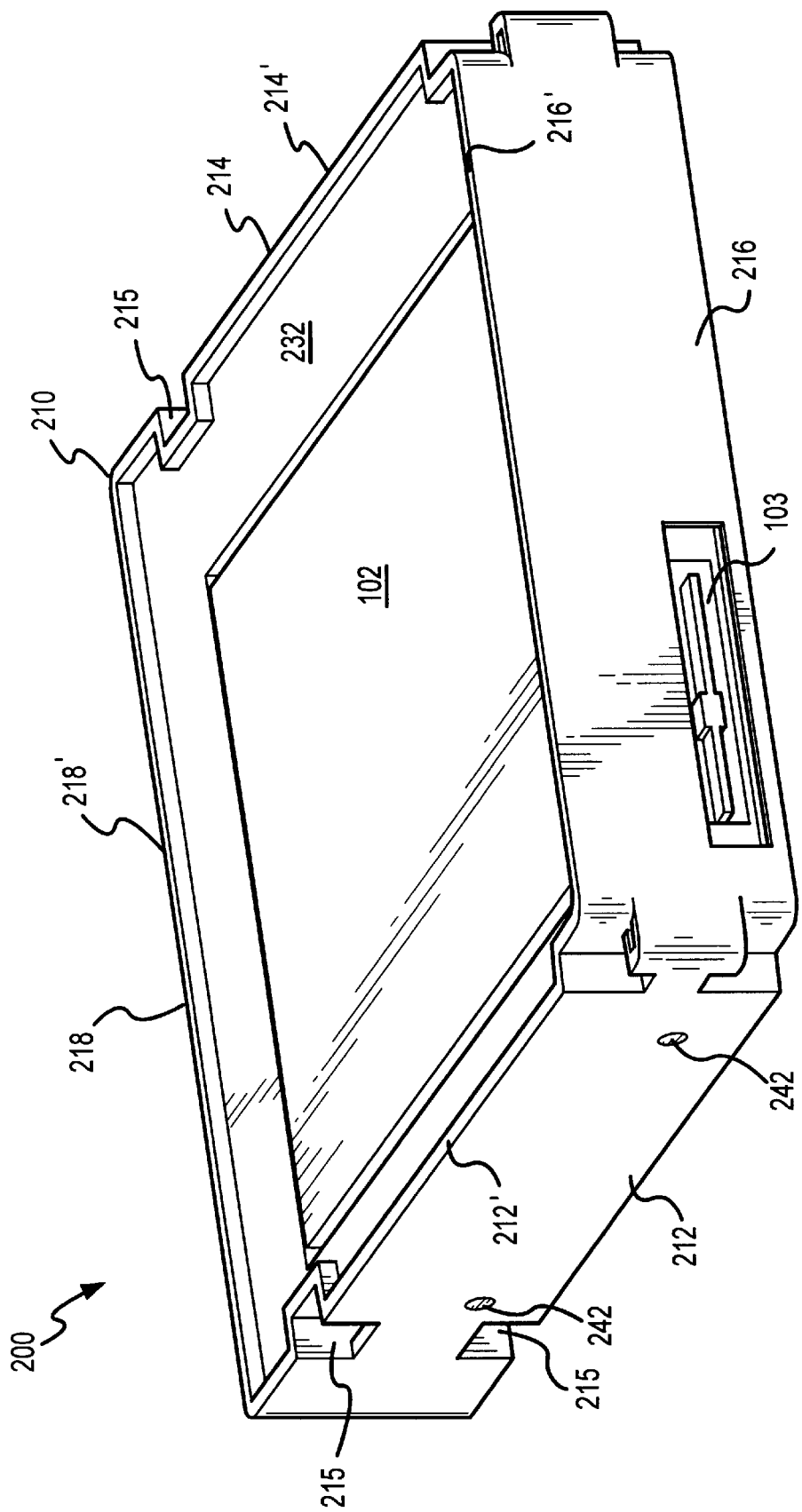
FIG. 5 is top-front perspective view, generally showing a disk drive jacket according to a further embodiment of the present invention, including a disk drive unit installed within a jacket.
Figure 8:
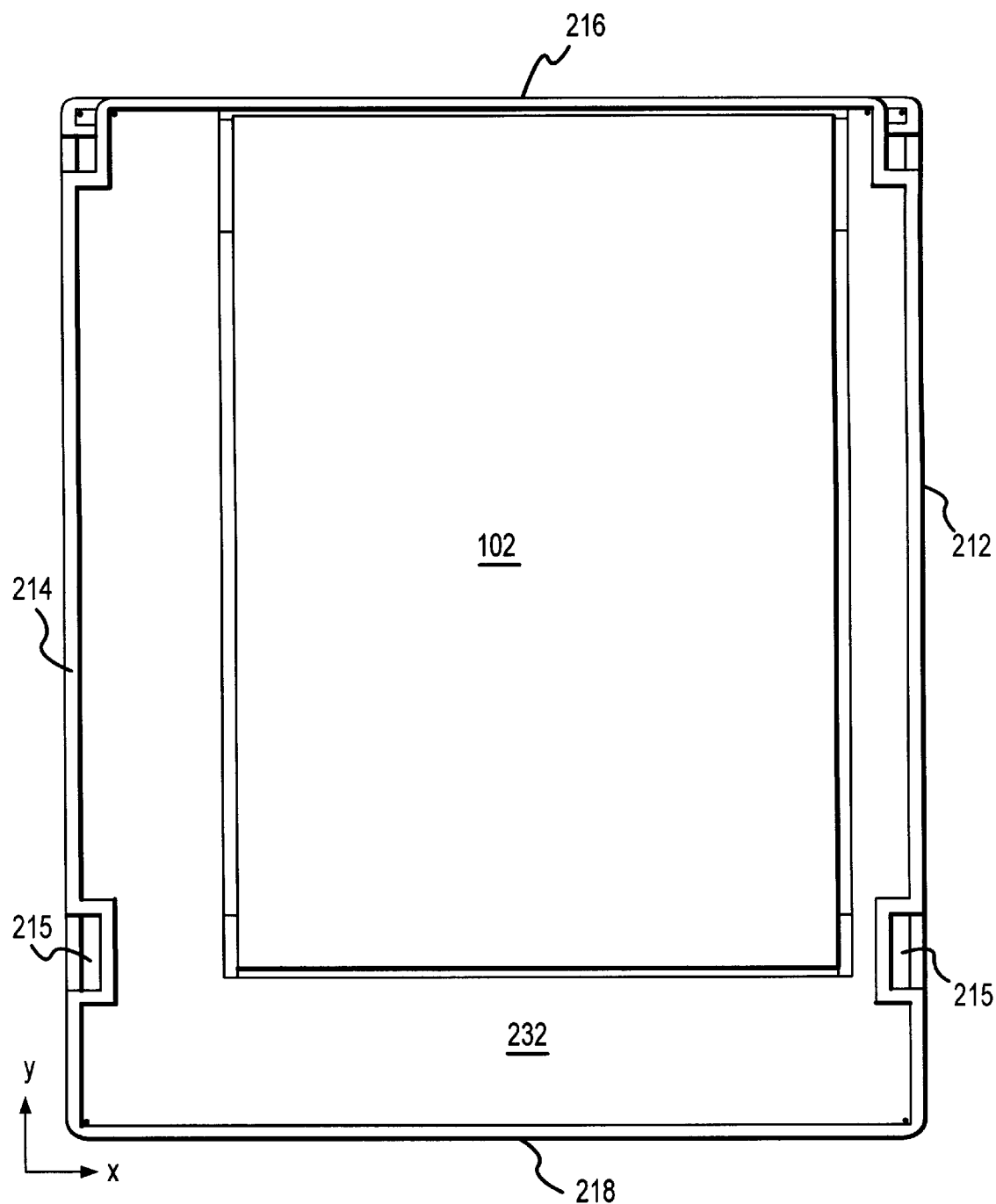
FIG. 8 is a top-plan view of the disk drive jacket of FIG. 5, with a disk drive unit installed in the jacket.

One end of each bracket arm extends from a partial top wall 232 of the frame 210. More particularly, in the illustrated embodiment (as best shown in FIGS. 5 and 8), the frame 210 defines a partial top wall 232 which extends from the side walls 212 and 214 and the front wall 218 and which spans over a portion of the housing interior. The partial top wall 232 defines a generally rectangular opening through the top of the frame and into the frame interior, through which the disk drive unit 102 may be received into or removed from the frame interior.

The brackets 220 and 222 extend, in a cantilevered fashion, from a free edge of the partial top wall 232. Due to the cantilevered extension from the partial top wall and the natural flexibility and resilience of the material from which the frame is made, the brackets, in effect, suspend and cradle the disk drive unit 102 (when installed within the jacket) form four bracket arms. This structure allows a small degree of resilient motion of the disk drive unit 102 within the frame (preferably in both the x and y directions, FIG. 8), for example, as a result of a physical shock imparted on the frame from an external force. In addition, the natural flexibility and resilience of the material from which the partial top wall 232 is made allows a small degree of resilient motion of the disk drive unit 102 in the z direction (the direction perpendicular to the plane of the page in FIG. 8), within the frame. Furthermore, to accommodate such x and y-direction motion, the frame 210 is configured such that, upon mounting the disk drive unit 102 within the frame, a small open space exists between the partial top surface 232 and the disk drive unit 102, and also between the front surface of the disk drive unit and the frame and between the rear surface of the disk drive unit and the frame, as well as between the bracket 220 and the side wall 214 and between the bracket 222 and the side wall 212. To accomodate such z-direction motion, at least two, and preferably all four, frame walls 212, 214, 216 and 218 are configured to extend in the z-direction beyond the top and bottom surfaces of the disk drive unit 102, such that the disk drive unit 102, in effect, is recessed with respect to the top and bottom of the frame. In this manner, upon the frame experiencing a physical shock, the brackets 220 and 222 and/or the partial top wall 232 are allowed to resiliently flex and the disk drive unit 102 is allowed to resiliently move slightly within the frame interior (relative to the frame walls), to absorb some of the shock.

In preferred embodiments, the frame 210 is provided with internal corner walls 234 and 236 at each rear corner, as well as an interior rear wall 238, for added structural strength. Each of the interior wall 234, 236 and 238 extends from the partial top wall 232, into the frame interior, and couple to either another interior wall and/or a frame side or rear wall, as best shown in FIGS. 6 and 7. Also as shown in FIGS. 6 and 7, at least one frame wall, such as the rear wall 218, may be provided with vent openings 240, for promoting air flow within the frame interior for cooling the disk drive device 102.

In further preferred embodiments, at least one (and preferably all) of the frame walls 212, 214, 216 and 218 define top edges 212', 214', 216' and 218' (best shown in FIG. 5), respectively, which extend beyond the top surface of the disk drive unit 102 (when disposed within the frame interior) and, more preferably, beyond the top surface of the partial top wall 232. This allows the frame to protect the disk drive unit 102 (when disposed within the frame), even if the top of the frame is placed or dropped onto a flat surface, such as a desk, table or floor surface. More particularly, if the frame is set with its top resting on, for example, a flat table surface, the extended wall edges 212', 214', 216' and 218' will effectively space the top surface of the disk drive unit 102 from the table surface.

Similarly, in preferred embodiments, at least one (and preferably all) of the frame walls 212, 214, 216 and 218 define bottom edges 212", 214", 216" and 218" (best shown in FIG. 7), respectively, which extend beyond the bottom surface of the disk drive unit 102 (when disposed within the frame interior). In this manner, the extended bottom edges 212", 214", 216" and 218" of the frame walls effectively space the bottom surface of the disk drive unit (when disposed within the frame) from a flat surface on which the frame may be placed. As an alternative to (or in addition to) the extended wall edges 212'–218' and/or 212"–218", the jacket frame 210 may be provided with protruding nubs (for example, similar to the shock absorbing corners with protruding nubs 26 described above with respect to the jacket 10 embodiment).

The jacket 200 includes certain features corresponding to features described above with respect to jacket 10, for cooperating with a computer device bay and a computer peripheral device 102. For example, as described above, jacket 200 includes at least one engagement mechanism (such as notches 215) which function with a retaining mechanism 106, similarly to notches 24 described above with respect to jacket 10.

In addition, grounding members (not shown in FIGS. 5–8) are preferably coupled to the outer side walls of the frame 210, for electrically coupling the disk drive unit 102 to a grounding conductor within a device bay (for example, similar to grounding members 30 described above with respect to the jacket 10 embodiment). In preferred embodiments, the grounding members may be grounding springs, such as springs 30 (or another suitable conductive connector) which may be electrically coupled to the disk drive unit 102 with electrical conductors (not shown), through holes 242 provided through side walls 212 and 214 of the frame 210.

Furthermore, electrical couplers (not shown) may be provided in the frame 210, or the frame 210 may be provided with an aperture through which an electrical coupler may pass for connecting the disk drive unit 102 to the computer device bay electrical connector 110, when the disk drive unit is disposed within the jacket 200 and the jacket is disposed within the computer device bay (similar to the arrangement shown in FIG. 1 with respect to jacket embodiment 10).

Also, similar to the jacket 10 embodiment described above, the rear wall 218 of the jacket frame 210 is preferably provided with an engagement surface for the computer device bay ejection mechanism 108 to engage, upon actuation of the ejection mechanism 108. Upon actuation, the ejection mechanism 108 applies a force against the jacket 200 to at least partially expel the jacket from the computer device bay 100, similar to the operation of the ejection mechanism 108 on the jacket embodiment 10 described above.

Also, similar to the above-described jacket frame 12, the frame embodiment 210 is preferably configured to be manufactured utilizing standard, injection molding processes. In one preferred form, the frame 210 is configured as a single, unitary structure having a shape and configuration suitable for injection molding manufacturing techniques. Thus, according to a preferred embodiment, a single piece, unitary, generally rectangular-shaped frame structure is formed by injection molding techniques. Following injection molding of the frame structure, suitable machining, boring and/or other manufacturing processes may be performed to complete the manufacture of the frame 210. Then, grounding conductors (such as springs 30) are attached to the outer surfaces of the sides 212 and 214 of the frame 210, adjacent the through holes 242.

A computer peripheral device, such as a disk drive unit 102, is inserted into the interior of the jacket 200, through the opening in the frame defined by the partial top wall 232, and rested on the ledges defined by the bracket lips 228 and 230. The disk drive unit 102 is secured to the brackets, using threaded fasteners coupled through the bracket arms 224 and 225, to industry standard mounting holes in the disk drive unit 102. The disk drive unit 102 is also electrically coupled to the grounding conductors and other electrical necessary electrical connections. The jacket 200, holding the disk drive unit 102, is then insertable into a computer device bay 100, in a manner similar to that described above with respect to the jacket 10 embodiment.

The above specification, examples and data provide a complete description of the manufacture and use of the composition of the invention. It is to be understood that a computer peripheral device referred to in the above specification includes, but is not limited to, hard and floppy disk drive units, CD-ROM devices, memory boards, tape drive units, flash memory cards, and any other device used in conjunction with a computer device bay. Since many example embodiments of the invention can be made without departing from the spirit and scope of the invention, the invention resides in the following claims.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A jacket for holding and retaining a computer peripheral device in a computer device bay, the computer device bay having an electrical connector, an electrical grounding surface and a retaining mechanism, the jacket comprising:

a unitary, single-piece frame having at least first and second opposing sides and a front, the first and second opposing sides having ends defining frame corners, the first and second opposing sides and the front defining a frame interior for receiving the computer peripheral device and further defining a frame exterior configured to be received within the computer device bay adjacent to the computer device bay electrical connector, the frame having a through hole to receive a fastener coupling the frame to the computer peripheral device upon receipt of the computer peripheral device in the frame interior, the frame also having shock absorbing mechanisms insulating the computer peripheral device from shock loads upon receipt of the computer peripheral device in the frame interior, the shock absorbing mechanisms formed integrally with the unitary, single-piece frame; and an engagement mechanism associated with the frame, the engagement mechanism engaging the retaining mechanism and retaining the frame in the computer device bay upon receipt of the frame in the computer device bay.

2. A jacket as claimed in claim 1 wherein the computer device bay further has an ejection mechanism, the jacket further comprising a frame rear, the frame rear being joined to the first and second opposing sides, the frame rear forming a surface adjacent to the computer device bay ejection mechanism against which the computer device bay ejection mechanism may press upon receipt of the frame in the computer device bay.

3. A jacket as claimed in claim 2, wherein the frame rear includes a cut-out opening to the frame interior, the cut-out permitting electrical coupling of the computer peripheral device to the computer device bay electrical connector upon receipt of the computer peripheral device in the frame and upon receipt of the frame in the computer device bay.

4. A jacket as claimed in claim 1, the jacket further comprising a support member disposed in the frame interior to support the computer peripheral device upon receipt of the computer peripheral device in the frame interior.

5. A jacket as claimed in claim 4, wherein a top wall extends between the first and second opposing sides and the front, the top wall defining an opening for receiving the computer peripheral device within the frame interior, and wherein:
the support member comprises a pair of brackets extending downward from the top wall into the frame interior, the pair of brackets defining a pair of support ledges for contacting the computer peripheral device.

6. A jacket as claimed in claim 4, wherein the support member comprises a ledge protruding into the frame interior from the first and second opposing sides.

7. A jacket as claimed in claim 6, wherein the support member substantially bridges the frame interior, and wherein the support member is reticulated.

8. A jacket as claimed in claim 1, wherein the shock absorbing mechanisms comprise hollowed sections formed in the frame corners.

9. A jacket as claimed in claim 1, wherein the frame exterior includes protruding nubs to space the frame exterior from the computer device bay, the protruding nubs permitting air cooling of the computer peripheral device upon receipt of the computer peripheral device in the frame interior and upon receipt of the frame in the computer device bay.

10. A jacket as claimed in claim 1, wherein the engagement mechanism comprises at least one notch provided in the frame.

11. A jacket as claimed in claim 1, wherein a top wall extends between the first and second opposing sides and the front, the top wall defining an opening for receiving the computer peripheral device within the frame interior, and wherein the shock absorbing mechanisms comprise a pair of brackets extending downward from the top wall into the frame interior, the pair of brackets secured to the computer peripheral device by fasteners to suspend the computer peripheral within the frame interior.

12. A jacket as claimed in claim 1, wherein the frame is composed of elastomeric material.

13. A jacket as claimed in claim 1, wherein the frame comprises an injection molded, substantially rigid plastic foam structure.

14. A jacket as claimed in claim 1, the jacket further comprising a grounding member for electrically grounding the computer peripheral device to the computer device bay electrical grounding surface upon receipt of the computer peripheral device in the frame and upon receipt of the frame in the computer device bay.

15. A jacket as claimed in claim 1 wherein the computer peripheral device fastener is electrically conductive and at least partially resides on the frame exterior, the jacket further comprising a grounding spring positioned along the frame exterior, the grounding spring being located proximate to the frame through hole, the grounding spring having an eyelet for receiving the electrically conductive fastener, the electrically conductive fastener providing an electrical ground circuit from the grounding spring to the computer peripheral device upon receipt of the computer peripheral device in the frame interior.

16. A jacket as claimed in claim 15, wherein the grounding spring protrudes relative to the frame exterior to contact and electrically couple the grounding spring with the computer device bay electrical grounding surface upon receipt of the frame in the computer device bay.

17. A jacket as claimed in claim 16, wherein the frame engagement mechanism, when engaged with the computer device bay retaining mechanism, and the grounding spring, when engaged with the computer device bay electrical grounding surface, substantially rigidly retains the frame in the computer device bay free of threaded fasteners.

18. A jacket for holding and retaining a computer peripheral device in a computer device bay, the computer device bay having an electrical connector, an electrical grounding surface and a retaining mechanism, the jacket made according to a process comprising:
(a) molding a unitary, single-piece frame having at least first and second opposing sides and a front, the first and second opposing sides and the front defining a frame interior and a frame exterior, the first and second opposing sides having ends defining frame corners, the frame having an opening to permit electrical coupling of the computer peripheral device to the computer device bay electrical connector, and the frame including shock absorbing mechanisms formed integrally with the unitary, single-piece frame to insulate the computer peripheral device from shock loads upon receipt of the computer peripheral device in the frame interior;
(b) providing a through hole in the frame to receive a fastener coupling the frame to the computer peripheral device upon receipt of the computer peripheral device in the frame interior; and
(c) attaching an electrical grounding member to the frame to permit electrical ground coupling from the frame interior to the computer device bay electrical grounding surface.

19. A process for using a jacket for holding and retaining a computer peripheral device in a computer device bay, the computer device bay having an electrical connector, an electrical grounding surface and a retaining mechanism, the jacket defining an exterior configured to be received within the computer device bay adjacent to the electrical connector and further defining an interior for receiving the computer peripheral device, and the jacket further defining an engagement mechanism for engaging the retaining mechanism in the computer device bay, the process comprising:
(a) forming the jacket from a single-piece, unitary frame having at least first and second opposing sides and a front, the first and second opposing sides having ends defining frame corners, the frame having shock absorbing mechanisms formed integrally with the single-piece, unitary frame to insulate the computer peripheral device from shock loads upon receipt of the computer peripheral device in the jacket interior;

(b) attaching a grounding member on the jacket exterior;

(c) positioning the computer peripheral device in the jacket interior;

(d) inserting a fastener through a hole defined in the frame;

(e) coupling the computer peripheral device to the frame and to the grounding member with the fastener;

(f) inserting the frame into the computer device bay;

(g) electrically coupling the grounding member with the computer device bay electrical grounding surface;

(h) coupling the computer peripheral device with the computer device bay electrical connector; and (i) engaging the engagement mechanism with the computer device bay retaining mechanism to retain the frame in the computer device bay.

* * * * *